Sept. 4, 1956
D. F. HORNIG
2,761,350
DOUBLE BEAM RATIO MEASURING SPECTROPHOTOMETER
Filed July 26, 1951
4 Sheets-Sheet 1
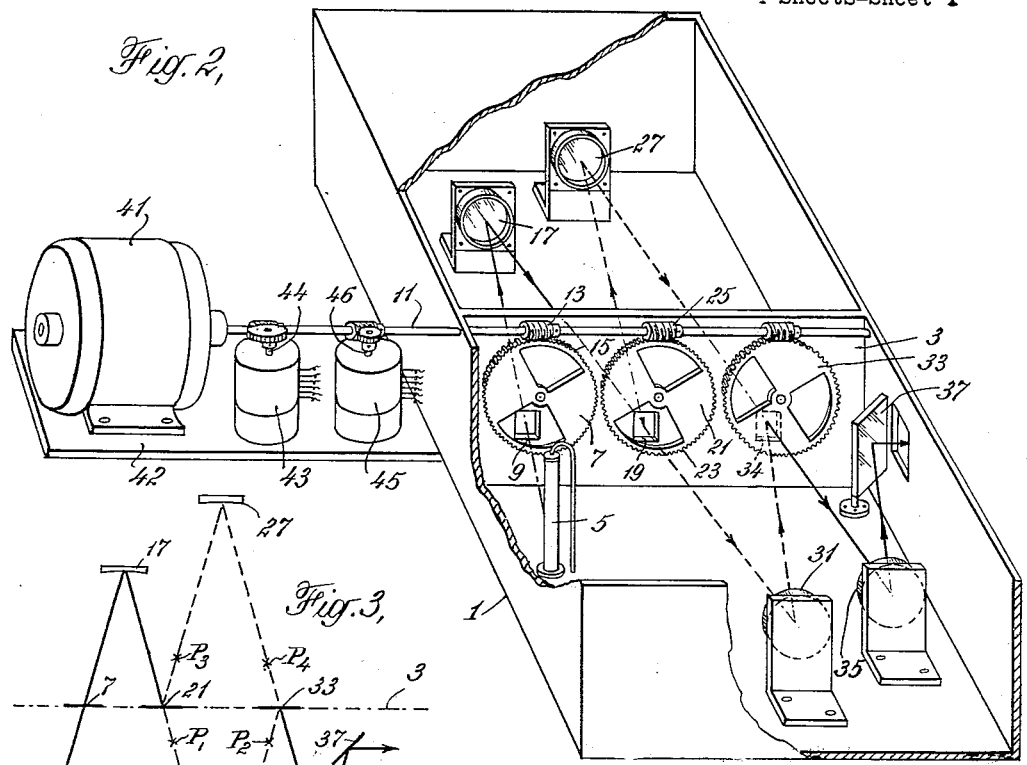
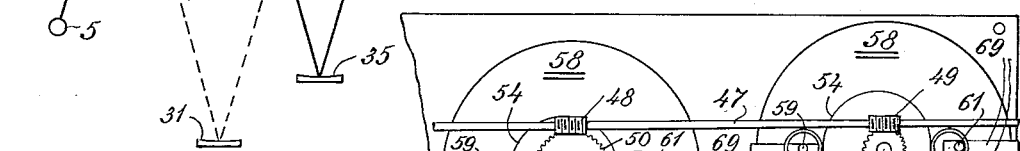
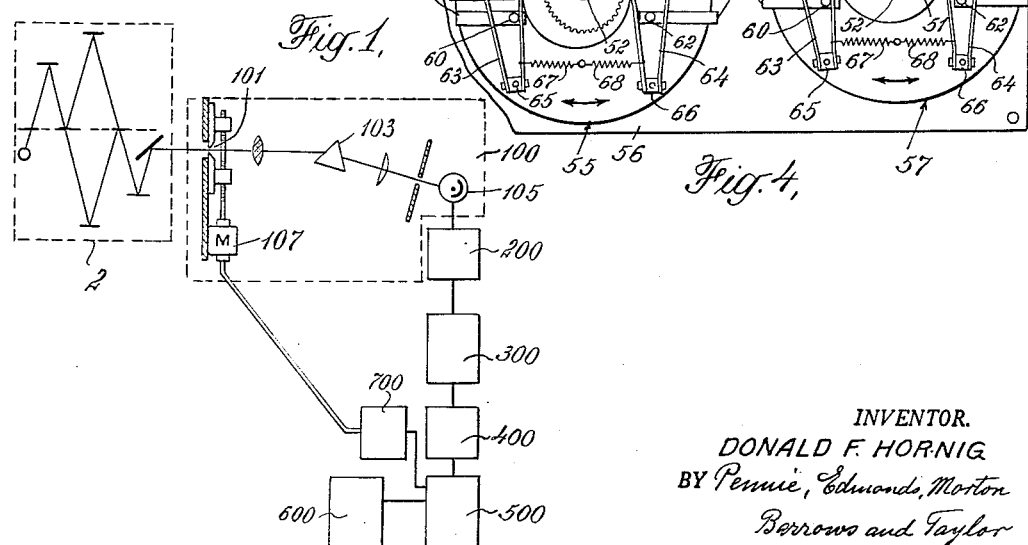
INVENTOR.
DONALD F. HORNIG.
BY Pennie, Edmonds, Morton
Borrows and Taylor
ATTORNEYS Sept. 4, 1956 D. F. HORNIG 2,761,350
DOUBLE BEAM RATIO MEASURING SPECTROPHOTOMETER
Filed July 26, 1951. 4 Sheets-Sheet 2

INVENTOR
DONALD F. HORNIG
BY Pennie, Edmonds, Morton
Barrows and Taylor
ATTORNEYS

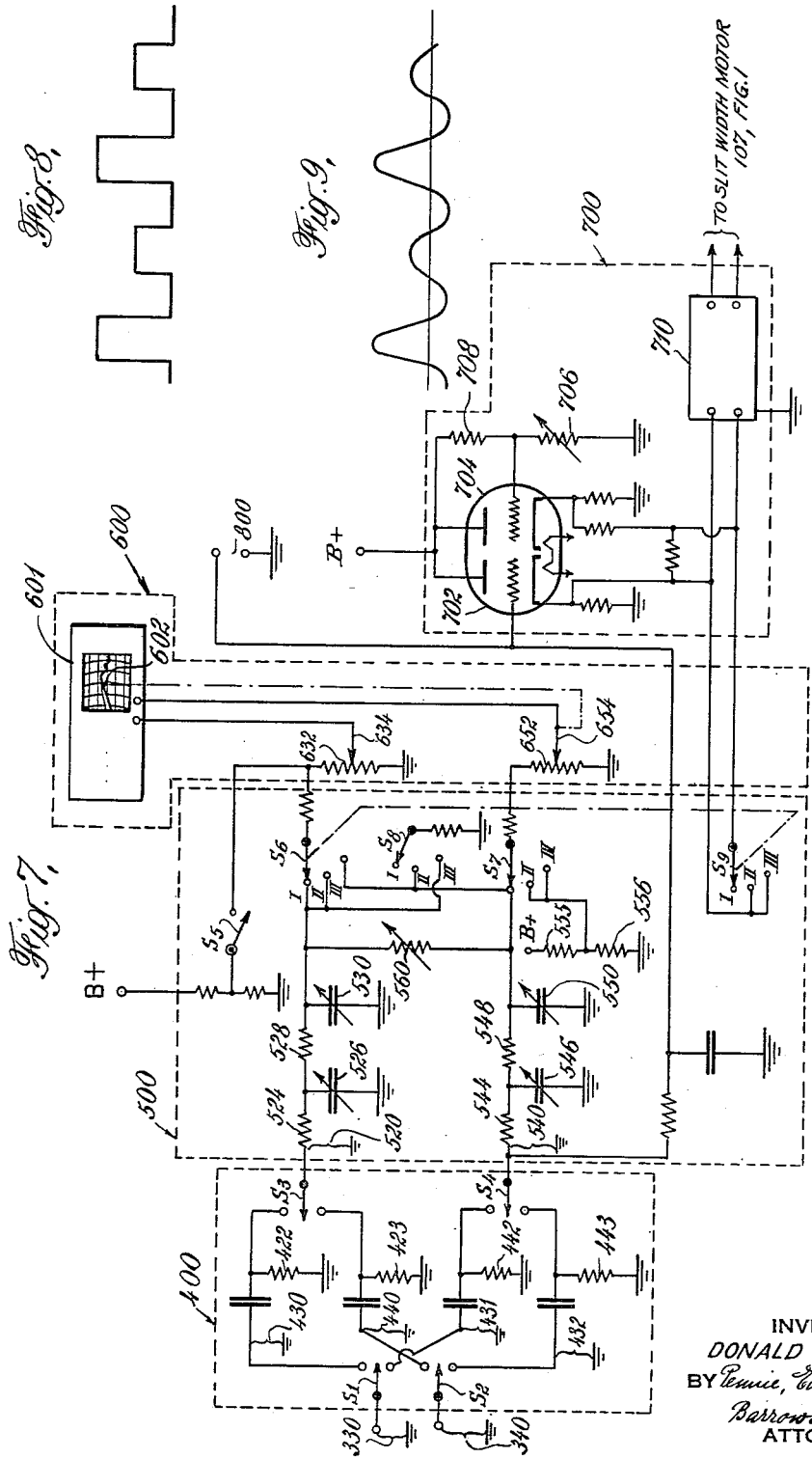

Sept. 4, 1956  D. F. HORNIG  2,761,350
DOUBLE BEAM RATIO MEASURING SPECTROPHOTOMETER
Filed July 26, 1951  4 Sheets-Sheet 4

INVENTOR
DONALD F. HORNIG
BY Pennie, Edmonds,
Morton, Barrows and Taylor
ATTORNEYS United States Patent Office 2,761,350
Patented Sept. 4, 1956

2,761,350

DOUBLE BEAM RATIO MEASURING SPECTROPHOTOMETER

Donald F. Hornig, Providence, R. I.

Application July 26, 1951, Serial No. 238,746

8 Claims. (Cl. 88—14)

This invention relates to spectrophotometry and more particularly to a double beam ratio recording spectrophotometer including means for securing complete equivalence of the beams by which the standard and sample specimens to be compared are irradiated, and means which compensate for the mixing in the radiation detector and in its amplifier of responses due to radiation from the standard and from the sample beams.

Spectrophotometers are known in which beams of light departing from different portions of a source pass through standard and sample specimens and thence through a spectrometer to fall upon a detector. The detector is substantially continuously illuminated by light from either the sample or the standard, and the phase and magnitude of the detector output signal is employed to adjust the strength of one of the beams by means of an attenuator until the detector gives zero A. C. output signal. The amount of attenuation required to be introduced to produce such zero output signal is then a measure of the relative transmissions (or reflections) of the standard and sample specimens. By virtue of the different areas of the source employed to generate the two beams and by virtue of the attenuation of one beam to produce balance, the two beams are not entirely equivalent, and the accuracy of the comparison is accordingly impaired.

It has further been proposed by A. Savitzky and R. S. Halford ("Review of Scientific Instruments," volume 21, Number 3, March 1950, page 203) to construct an instrument in which nearly equivalent beams are used and in which the radiation is sent through the standard and sample specimens in two trains of pulses, displaced from each other by 90° of phase in a cycle containing for each beam or train of pulses 180° of illumination and 180° of darkness. In this instrument the pulses of one train overlap the pulses in the other so that separation of the energy in the two trains of voltage pulses at the detector or amplifier output is accomplished by mechanical breakers displaced from each other 90° in phase to effect discrimination as to phase among the components of the amplifier output. The voltages in the two channels to which the breakers sort the voltage pulses may then be filtered and compared to give the ratio of the intensities of the two trains of light pulses. Unless this discrimination as to phase is perfect, the results will be falsified by cross talk in the two channels following the phase sorting. In practice the phase discrimination cannot be perfect, due to phase distortion in the amplifier or to the time constant of the detector being comparable or long compared to the length of the light pulses, or to both. In view of this fact, in the paper of reference there is employed a sharply tuned amplifier which passes only the fundamental frequency component of the square wave excitation of the detector, so that phase distortion is excluded.

The present invention provides a spectrophotometer in which complete equivalence of the two beams is obtained, the radiation for both originating on a single identical area of the source, and in which the ratio measuring circuit includes means compensating for mixing in the detector and amplifier of signal components originating respectively with the standard and sample. This compensation means obviates the limitations on the length of the light pulses compared to the time constant of the detector which have heretofore had to be observed. It accordingly permits greatly increased speeds of operation, since the pulses can be made short rather than long by comparison with the time constant of the detector. The signal compensating means employed in the instrument of the present invention is disclosed and claimed in the copending application of Donald F. Hornig and George E. Hyde, Serial No. 238,745, filed July 26, 1951.

The invention will now be described in detail by reference to the accompanying drawings in which Fig. 1 is a diagram, partly schematic and partly in block form, of a complete spectrophotometer according to the invention;

Fig. 2 is a perspective view of a slit illuminator according to the invention and of a set of switches which are for convenience mechanically associated therewith for sorting and rectifying at the output of an amplifier the signals from the spectrometer detector which are proper to illumination of the standard and of the sample under investigation;

Fig. 3 is an optical diagram of the slit illuminator of Fig. 2;

Fig. 4 is a diagrammatic representation of one combination of sorting and rectifying switches suitable for use in the invention;

Fig. 7 is a schematic diagram of a ratio measuring and compensating circuit including the sorting and rectifying switches of Fig. 4, a ratio recording circuit, and a circuit adapted to generate a signal for control of the slit width in the spectrometer;

Fig. 8 is a diagram illustrating the illumination of the entrance slit of the spectrometer of Fig. 1 as a function of time for an assumed sample and standard under investigation and with a preferred form of light pulse generating shutter;

Fig. 9 is a diagram of the voltage at the input to the preamplifier of Fig. 5, assuming illumination of the spectrometer of the form shown in Fig. 8;

Figure 5:
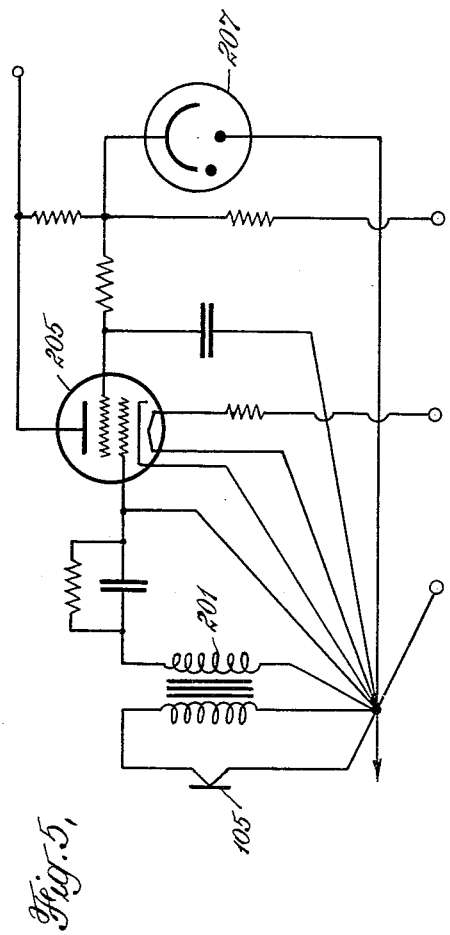
Fig. 5 is a schematic diagram of a preamplifier unit suitable for use in the instrument of Fig. 1.

The spectrophotometer of Fig. 1 includes a slit illuminator indicated at the dashed line box 2, a spectrometer 100, a preamplifier 200, a signal amplifier 300, a signal sorting and rectifying unit 400, a ratio measuring and compensating circuit 500, a ratio recording circuit 600, and a slit width control circuit 700.

The slit illuminator 2 generates two series of light pulses of which one series is applied to the standard and the other to the sample, both series being recombined for presentation to the spectrometer 100 at an entrance slit 101. In the spectrometer, which may be of either the grating or prism type, a dispersing element 103 selects progressively different wave length components of both series of pulses for the excitation of a detector 105 such as a bolometer or thermocouple. The detector output signal is raised to a suitable level in the preamplifier 200 and amplifier 300. The amplified detector output is then applied to a circuit 400 which sorts it into trains of voltage pulses approximately representative of the excitation of the detector by the standard and sample beams. These fractions are also rectified in the circuit 400 before being applied to a ratio measuring and compensating circuit 500. The ratio circuit measures the ratio of the standard and sample voltages and compensates for any signal mixing between the standard and sample signals which may take place electrically in the detector and amplifier. The standard signal in the ratio circuit is applied to a slit width control circuit 700 whose output is fed back to the spectrometer 100 to actuate a slit width control mechanism 107 coupled to the entrance slit 101 to keep the energy in the standard beam constant. A ratio recording circuit 600 records the ratio of the standard and sample transmissions or reflections.

In the embodiment of the invention to be described herein the sorting and rectifying switches are physically associated with the slit illuminator for convenience of operation. They may however be elsewhere located and separately driven. The slit illuminator of Fig. 2 is essentially a device for passing successive pulses of radiation from a source over two separate but optically identical paths and for recombining the pulses for presentation to a spectrometer. A sample of a substance whose transmission or reflection is to be measured is inserted in one path while a standard cell or reflecting surface is inserted in the other.

In Fig. 2 a housing 1 (shown with its cover and sides broken away) is provided with a transverse partition or framework 3 which supports the shutter and sector mirrors presently to be described by means of which the trains of pulses for the standard and sample paths are generated. A source 5 and two spherical mirrors 31 and 35 are located with a plane mirror 37 on one side of the partition 3 and two further spherical mirrors 17 and 27 are located on the other side in the relative positions indicated in Fig. 3. Any convenient source of radiant energy in the wave length range to be considered may be employed. Fig. 2 shows a cylindrical element 5 adapted to be heated electrically to a radiant temperature. In Figs. 2 and 3 the continuous portions of the lines between the source 5 and the plane mirror 37 represent the common portions of the optical path between the source and the input to the spectrometer whereas the dotted and dashed portions respectively represent the standard and sample paths or vice versa.

Referring to Fig. 2, a shutter 7 is rotatably mounted on the partition 3 in position alternately to pass and block the beam passing from the source 5 to the spherical mirror 17. To accommodate the beam an opening 9 is provided at an appropriate position in the partition, and this opening may be used to define the limits of the beam. If the beam is elsewhere defined, the partition may be dispensed with except as required to support the shutter 7 and sector mirrors 21 and 33.

The shutter 7, shown in the figure as having the form of a wheel from which two oppositely disposed sectors of 90° are removed, is rotated by means of a drive shaft 11 whose worm 13 meshes with teeth 15 cut on the periphery of the shutter 7. In an embodiment which has been successfully built and operated, the shutter 7 has been driven at such speed as to pass some six pulses of light per second. At this speed therefore a succession of pulses of light approximately .08 seconds in duration and spaced by intervals of the same length are passed. These pulses fall upon a spherical mirror 17 from which they are reflected in a beam whose axis passes through an opening 19 in partition 3 associated with a rotating sector mirror or reflecting shutter 21. Mirror 21 passes and reflects successive pulses to separate them into two trains of which one is applied to the sample and the other to the standard.

Mirror 21, likewise driven by worm gearing from the shaft 11, is of the same general shape as the shutter 7 but is mirrored on the side presented to mirror 17. Its teeth 23 and associated worm 25 are cut to rotate it at half the speed of shutter 7, and it is phased to clear the opening 19 for one pulse from the shutter and to reflect the next succeeding pulse toward a second spherical mirror 27.

A pulse of light which is not reflected at sector mirror 21 passes through a focal point $P_1$ (Fig. 3) and on to a third spherical mirror 31. Here it is reflected through another focal point $P_2$ toward a second sector mirror or reflecting shutter 33 so phased that the light is reflected toward a fourth spherical mirror 35 from which it is reflected in a convergent bundle to a plane mirror 37 and thence out of the housing 1 at an opening 39 and into the spectrometer (Fig. 1). The sector mirror 33 may be of the same construction as the sector mirror 21, and it is driven at the same speed. However its reflecting face is on the side facing mirror 31, and it is phased with respect to the mirror 21 to pass light while mirror 21 reflects light and vice versa. Thus in the particular construction shown, mirror 33 is rotationally displaced 90° from mirror 21.

The next pulse of light originating at shutter 7 will be reflected at sector mirror 21. It will pass through a focal point $P_3$ to the spherical mirror 27 and then through another focal point $P_4$ and through an opening 34 in partition 3 at mirror 33 to rejoin the optical path traced by pulses not reflected at mirror 21.

The shaft 11 of Fig. 2 is turned by a motor 41 supported on a base plate 42 affixed to the housing 1. Motor 41 is also employed to operate the switches which sort and rectify the voltage pulse trains proper to the standard and to the sample paths produced in the spectrometer detector.

In Fig. 2 a sorting switch unit 43 includes a shaft 44 coupled to shaft 11 to turn at the same speed as the shutter and a rectifying switch unit 45 includes a shaft 46 coupled to shaft 11 to turn at twice the speed of the shutter. Phase adjustment of the switch units 43 and 45 with respect to the shutter is provided for by rotation of their housings. A construction suitable for use in switch units 43 and 45 will be described in connection with Fig. 4.

If a standard cell is placed in the light path between mirrors 21 and 27 and if a sample having half the transmission of the standard is placed in the light path between mirrors 21 and 31, the intensity of the light at the mirror 37 will vary as a function of time as shown in Fig. 8.

The arrangement of Figs. 2 and 3 insures an equal intensity of source for both light paths since the same emitting area on the source is used for both. The complete equivalence of the paths makes it possible to eliminate atmospheric absorption from the spectra. The shutter 7 may advantageously be made opaque to all radiation and thus serves to distinguish radiation from the source 5 from any other radiation such as that which might be introduced for example by a hot sample emitting radiation of its own. If the shutter is opaque in the wave length region being studied but transparent at other wave lengths, for example at shorter wave lengths, the effect of stray short wave length radiation can be largely eliminated since it does not contribute to the alternating component of the light intensity, which is the only component employed for the comparison of the standard and sample beams in view of the use of an alternating current amplifier at the output of the spectrometer.

The introduction of dark intervals, i. e. intervals of zero radiation intensity, between successive light pulses permits potentiometric comparison of the two beam intensities as well as absolute measurement of the intensity of the standard beam, which is used for slit width control. The presence of foci in the two light paths makes it possible to use small samples of liquids or solids placed at or near the focal points. On the other hand it is possible to accommodate large gas cells in the vicinity of the mirrors 31 and 27. Moreover, the common portion of the path between the shutter 7 and the spectrometer makes it possible to insert filters or polarizers without affecting the balancing between the two beams.

The light pulses emerging from the slit illuminator are applied to the spectrometer, where successively different ranges of wave length excite a detector 105 whose output voltage signals are applied to the preamplifier 200 preferably mounted close to the spectrometer.

A circuit suitable for the preamplifier unit 200 is shown in Fig. 5. A thermocouple 105 is coupled to the grid circuit of the amplifier tube 205 through a transformer 201. The tube 205 is operated at reduced filament, screen and plate voltages in order to introduce minimum noise and to retain a minimum pickup level. The plate supply voltage for this stage is decoupled from the amplifier 300 (Fig. 6) by the use of a voltage regulator tube 207. All B— returns from the thermocouple, input transformer 201 and tube 205 are preferably made to a single grounded point.

Figure 6:
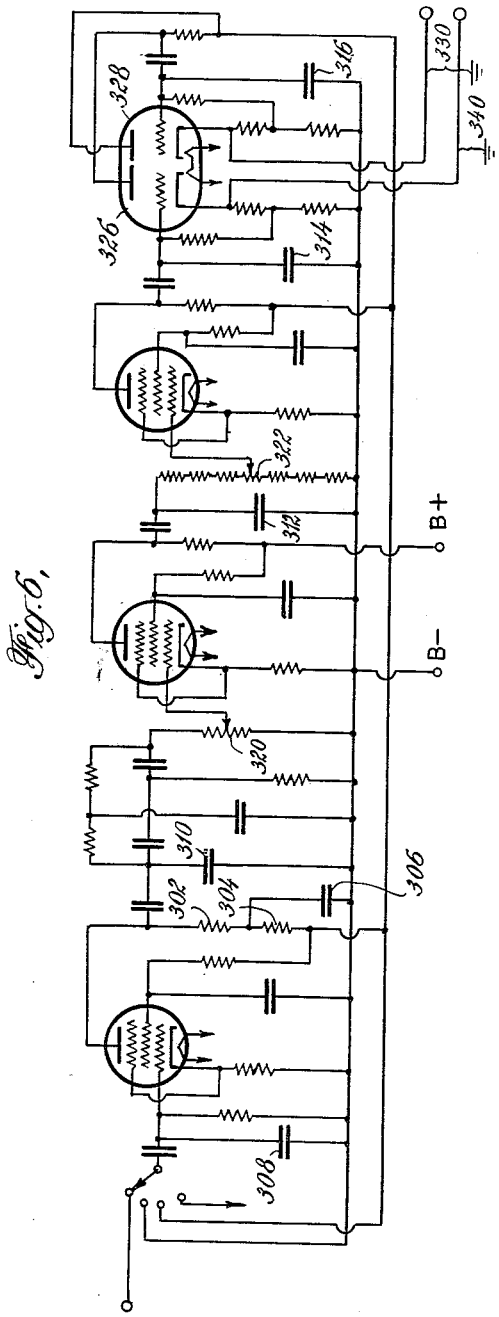
Fig. 6 is a schematic diagram of an amplifier suitable for use in the instrument of Fig. 1.

The signal on the plate of the preamplifier tube 205 is further amplified in an amplifier 300 for which a suitable circuit is shown in Fig. 6. To insure adequate separation of high and low levels the stages are preferably laid out in line. The by-passed cathode resistors provide negative feedback which increases the linearity of the amplifier. A network consisting of resistors 302, 304 and condenser 306 in the first stage provides approximate correction for the phase shift arising in the input transformer 201 and coupling circuits at low frequencies. Condensers 308, 310, 312, 314 and 316 serve to attenuate the high frequencies which are not needed and which might cause instability or oscillations. Resistors 320 and 322 serve as gain controls which are employed in conjunction with the slit width control circuit 700 in the initial adjustment of the instrument. The tube filaments are preferably lighted from a storage battery to reduce pickup at the power line frequency.

The output circuit of the amplifier consists of two balanced cathode followers 326 and 328 which provide low impedance sources of opposite polarity for two signal channels formed each between ground and the cathode of one of the tubes 326 and 328, feeding into the sorting and rectifying unit 400 shown in Fig. 7.

The sorting and rectification of the signals at the output of the amplifier will now be described in connection with Figs. 7 and 10.

Assuming for purposes of explanation only that the spectrometer has a detector whose time constant is short by comparison with the pulses of light employed and that the amplifier has a wide pass band, the signal on the plate of the third amplifier stage in Fig. 6 may be taken to have the general shape of the waveform shown in Fig. 8. On these assumptions further the output signals from the cathode follower stages 326 and 328 will have respectively the shape of waveforms A and B of Fig. 10 (apart from a D. C. component not shown).

In the sorting and rectifying circuit 400 of Fig. 7 switches $S_1$ and $S_2$ which are driven in synchronism with the shutter of the slit illuminator, divide waveforms A and B in time. While a pulse is being sent from the source to the spectrometer via the path occupied by the sample specimen, switches $S_1$ and $S_2$ connect channels 330 and 340 with a pair of channels 430 and 440 leading to rectifier switch $S_3$. While a light pulse is being sent over the optical path in the slit illuminator occupied by the standard specimen, switches $S_1$ and $S_2$ connect channels 330 and 340 with two additional channels 431 and 432 leading to rectifier switch $S_4$. In this way voltage pulses corresponding to illumination of the sample are made available for rectification at switch $S_3$, whereas voltage pulses corresponding to illumination of the standard are made available for rectification at $S_4$. The rectified products of $S_3$ and $S_4$ appear across channels generally indicated at 520 and 540 in the ratio measuring and compensating circuit 500.

$S_1$ and $S_2$ move together, feeding (via rectifier switch $S_3$) channel 520 for half of the pulse, cycle and feeding channel 540 (via rectifier switch $S_4$) for the other half. While switches $S_1$ and $S_2$ operate at the same speed as shutter 7, rectifier switches $S_3$ and $S_4$ also operate together and in the same phase but at twice the shutter speed. Desirable switch phasings are shown in Fig. 10 above waveform A. With the phasings indicated, the voltages across resistors 443 and 442 of the sorting and rectifying circuit are shown at waveforms C and D. Those across resistors 423 and 422 are shown at waveforms H and I. Full wave rectification of each of these pairs of signals is effected by switches $S_4$ and $S_3$ respectively to produce (apart a filtering action) waveforms G and L in channels 540 and 520.

Waveforms E and F respectively represent the fractions of waveforms C and D selected by $S_4$ for channel 540. Similarly waveforms J and K respectively represent the fractions of waveforms H and I selected by $S_3$ for channel 520, their sum being waveform L.

It is desirable that the switches be phased to shift their positions at times at which there is a maximum separation between the standard and sample signals. In practice the phasing is adjusted for maximum D. C. signal, as indicated for example at a vacuum tube voltmeter connected across the standard channel at 800 as shown in Fig. 7. Errors in phasing reduce the sensitivity of the instrument but are within limits corrected by the compensating means of the invention.

A combination of switches suitable to serve in the switching units 43 and 45 of Fig. 2 and as the switches $S_1$—$S_4$ of Fig. 7 is shown diagrammatically in Fig. 4. A shaft 47 suitably supported above a base plate 56 carries worms 48 and 49. Shaft 47 may be identical with the shaft which drives the shutter and sector mirrors as in the embodiment of Fig. 2, or it may be independent thereof. If mechanically independent, it must be driven synchronously with the shaft 11 so as to give to worm wheel 50 engaging worm 48 the same speed of rotation as the shutter 7. Worms 48 and 49 on shaft 47 respectively engage worm wheels 50 and 51. Worm wheel 51 has one half the diameter of worm wheel 50 and therefore turns at twice the speed of the latter. Each of worm wheels 50 and 51 is pinned to a shaft 52. With its shaft 52 worm wheel 50 operates a sorting switch unit generally indicated at 55, whereas worm wheel 51 operates a rectifying switch unit 57. The two units may be identical except for their worm wheels 50 and 51. In each, shaft 52 is journaled for rotation in the base plate 56 and carries with it a cam 54 for actuation of the switches proper. In each switch unit an insulating support 58 is centered about the shaft 52 for rotational adjustment with respect to the base plate 56. The support 58 carries four contact terminals 59, 60, 61 and 62 in two pairs and two bow-shaped contact blades 63 and 64. The contact blade 63 surrounds terminals 59 and 60 and is fastened to support 58 by means of a block 65 but is biased toward the center of rotation of the cam 54 by means of a spring 67. Blade 64 is similarly fastened at a block 66 and is biased by a spring 68. The terminals 59, 60, 61 and 62 are mounted on shoes 69 which fit into grooves cut in the support 58 to permit individual phase adjustment of the making and breaking of contact at each of the terminals. Switch blades 63 and 64 are positioned approximately 180° apart on the circle of rotation of cam 54. The cam 54 is of eccentric circular shape so proportioned that, subject to small adjustments to the positions of the terminals 59—62, one of the blades 63 and 64 always makes contact with its inner terminal 60 or 62, whereas the other blade is held by its spring in contact with its outer terminal 59 or 61. Adjustment in phase of each switch unit as a whole is effected by rotating the supporting plate 58 with reference to the base plate 56.

The switch units 55 and 57 are wired into the circuit of Fig. 7 to connect blades 63 and 64 of sorting unit 55 to the non-grounded sides of amplifier output channels 330 and 340, and blades 63 and 64 of rectifying unit 57 to the non-grounded sides of sample and standard channels 520 and 540 in ratio circuit 500. The terminals 59, 60, 61 and 62 in unit 55 are connected respectively to the ends of the non-grounded sides of channels 430, 431 and 440, 432 of the rectifying and sorting circuit 400, adjacent the amplifier, and terminals 59, 60, 61 and 62 of unit 57 are connected respectively to the ends of the non-grounded sides of channels 430, 440, 431 and 432 adjacent the ratio circuit.

The rectified signals appearing at S3 and S4 are directly proportional to the radiation intensities in the sample and standard beams, except for mixing in time of the standard and sample signals by the detector and amplifier, taken care of by the compensating means of the invention presently to be described.

The signals on S3 and S4 are smoothed by matched RC filters comprising resistors 524, 528 and condensers 526, 530 in the sample channel and resistors 544, 548 and condensers 546, 550 in the standard channel.

The time constants of these filters determine the speed of response of the instrument. To provide control thereof the condensers 526, 530, 546 and 550 are preferably provided as variable condensers arranged together on a ganged selector switch so that the time for response can be varied over a suitable range. A range of from 3 to 50 seconds for 90% response has been found sufficient. Increasing the time constant of the filters gives slower response but reduces the noise level.

The ratio of the smoothed voltages in the sample and standard channels is obtained from a potentiometer circuit, shown together with an amplifier-recorder 601 within a dashed line box 600 in Fig. 7. A resistor 632 is connected across the output of the sample channel 520. A movable tap 634 on resistor 632 permits selection of any desired fraction of the sample channel voltage for application to the amplifier-recorder 601. Tap 634 is set to define a unity ratio reading at any desired point across the width of the paper in the recorder when the standard and sample specimens are the same. A precision potentiometer 652 is connected across the output of the standard channel 540, and its movable tap 654 is mechanically linked to mechanism in the recorder 601 which operates a pen 692 in that unit. The amplifier-recorder unit 601 compares the voltages at the taps 634 and 654 and actuates a suitable mechanical device which traverses the tap 654 on potentiometer 652 until the voltages from the two taps to ground are equal, bringing the input to the amplifier-recorder to zero.

The detector element 105 has a finite heat capacity, whatever its nature. It heats and cools exponentially and cannot follow the square wave shape of the light intensity presented to the spectrometer as illustrated in Fig. 8. This causes a mixing of the responses to the light pulses in the standard and sample beams. Signal mixing is also caused by phase shift and limited frequency response in the preamplifier and amplifier and in the coupling transformer 201 of Fig. 5. The effect of signal mixing in the detector and coupling transformer is illustrated in Fig. 9, which represents the waveform on the grid of tube 205 in the preamplifier when the spectrometer is illuminated with light of the waveform shown in Fig. 8.

The signal mixing caused by poor low frequency response of the amplifier is negative, i. e. it effects a subtraction of energy from rather than an addition of energy to the response attributable to the next arriving light pulse. Customarily this negative signal mixing cut-weighs the positive signal mixing due to the finite heat capacity of the detector. In such case each light pulse is represented in its appropriate channel of the ratio circuit 500 by a voltage pulse which is deficient by a quantity which is proportional to the intensity of the preceding light pulse as received by the detector. Correction of the ratio resulting from this signal mixing is achieved according to the method described in the copending application of Donald F. Hornig and George E. Hyde, Serial No. 238,745, filed July 26, 1951, by coupling a fraction of the voltage in each channel into the other.

Most conveniently the coupling means takes the form of a variable resistor shown at 560 in Fig. 7. The resistor 560 is adjusted to give the correct ratio when specimens of known transmission are placed in the two light paths of the slit illuminator. A pair of non-inverting vacuum tube connections such as cathode followers, which should have the same gains, may also be used. The operation of the compensating means will be better understood from the following analysis.

Let $V_1$ be the true signal due to the standard specimen, i. e. the voltage output of a radiation detector and amplifier without signal mixing, and let $V_2$ be the true signal due to the sample. Let further the corresponding apparent signals, i. e. those which would appear across each of the channels 540 and 520 in the absence of compensating resistor 560 by $V_1'$ and $V_2'$. Then $$V_1' = V_1 + fV_2$$
$$V_2' = V_2 + fV_1 \quad (1)$$

in which $f$ is the mixing constant. The same mixing constant $f$ applies in both cases because of the identical treatment of the two signals both optically and electrically. The apparent ratio $R'$ of the intensities is then $$R' = \frac{V_2 + fV_1}{V_1 + fV_2} = \frac{R+f}{fR+1} \quad (2)$$

$R$ being the true ratio of intensities $V_2/V_1$.

The resistance 560 coupling together the output signal channels 520 and 540 on their positive sides changes the voltages $V_1'$ and $V_2'$ to new values $V_1''$ and $V_2''$. The voltages introduced by resistor 560 are fractions $g$ of the difference between the voltages $V_1''$ and $V_2''$. Therefore $$V_1'' = V_1 + fV_2 + g(V_2'' - V_1'')$$
$$V_2'' = V_2 + fV_1 + g(V_1'' - V_2'') \quad (3)$$

or $$(1+2g)V_1'' = aV_1 + bV_2$$
$$(1+2g)V_2'' = aV_2 + bV_1 \quad (4)$$

where $$a = 1+g+fg \text{ and } b = f+g+fg \quad (5)$$

Hence:

$$R'' = \frac{aR+b}{a+bR} \quad (6)$$

in which $R''$ is the apparent ratio with resistor 560 in the circuit. The condition that $R''$ be equal to $R$ for all values of $R$ is simply that $$b = 0$$

Consequently resistor 560 must be so adjusted that $$g = -\frac{f}{f+1} \quad (7)$$

In Equation 7, $g$ is positive if $f$ is negative, and a resistor will suffice as coupling element. This is customarily the case because the mixing effect due to inadequate low frequency response in the alternating current devices between the radiation detector and the rectifying circuit predominates over the mixing due to time lag in the radiation detector. Consequently a resistor may be employed as coupling element, as shown in Fig. 7. In cases where $f$ is positive, a negative coupling factor $g$ may be obtained by using a pair of vacuum tubes arranged to produce 180° of phase change and connected in opposite directions between the two channels to provide reciprocal coupling between the two channels as does the resistor of the embodiment shown.

The instrument of the invention is preferably provided with means to adjust the entrance slit of the spectrometer so as to keep approximately constant the energy entering the spectrometer. This is accomplished by the slit width control circuit shown at the dashed line box 700 of Fig. 7. The pulsating D. C. voltage in the standard channel 540 at S4 is smoothed by a filter and applied to the grid of a cathode follower 702. The output voltage of tube 702 is compared by means of a second cathode follower 704 with a reference voltage derived from B+ by the resistance divider elements 706 and 708. The output of tubes 702 and 704 is applied to an amplifier 710. In the event of a difference between the inputs to amplifier 710 an output of appropriate sign is applied to a slit width control device such as the motor 107 shown in Fig. 1. The initial slit width adjustment is made by means of the amplifier gain controls 320 and 322 of Fig. 6.

In Fig. 7 a push-button switch $S_5$ is provided to apply a pulse of voltage to the terminating resistor 632 in the sample channel in order to produce a pip on the record in the amplifier recorder 601 for reference purposes.

Four additional three-position switches $S_6$, $S_7$, $S_8$ and $S_9$ are ganged together to permit recording not only of the ratio of the intensities from two beams but also the intensity in either beam individually. For this purpose a fixed reference voltage is derived from B+ through two divider resistors 555 and 556 and is applied to the second and third position terminals of $S_7$. In position I of switches $S_6$—$S_9$ the ratio of the voltages in the two channels 520 and 540 is measured and recorded. In position II the voltage in the sample channel 520 is compared with the reference voltage, and in position III the voltage in the standard channel is compared with the reference voltage. $S_9$ makes the slit width control circuit 700 inoperative during single beam operation.

Figure 10:
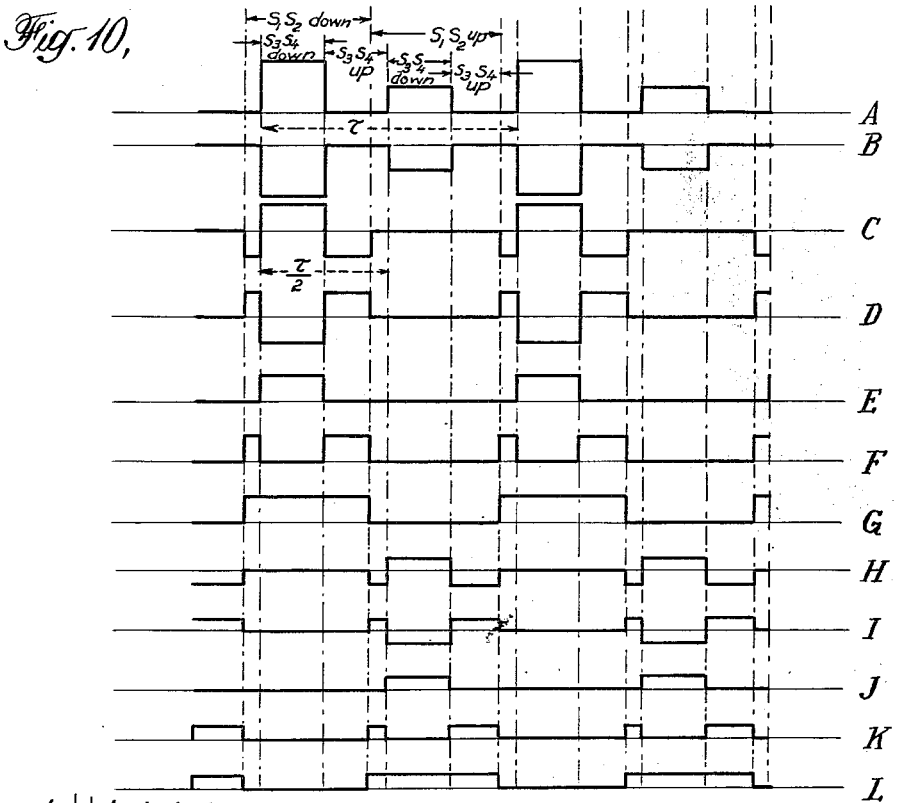
Fig. 10 is a diagram of certain waveforms, idealized in shape, useful in explaining the operation of the signal sorting and rectifying switches shown in Figs. 4 and 7.

In view of the signal mixing which occurs in the detector and amplifier, the voltage output from the amplifier in fact does not possess the rectangular shape of waveforms A and B of Fig. 10, and adjustment of the phase of switches $S_1$—$S_4$ should be made accordingly. This will be described in connection with Fig. 11.

Figure 11:
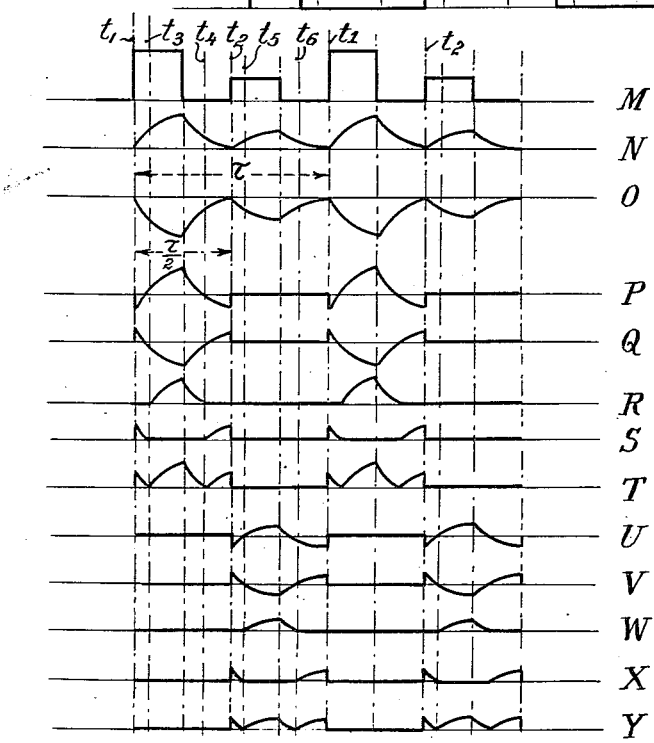
Fig. 11 is a representation of a typical waveform actually found at the output of the amplifier and of waveforms derived therefrom by the sorting and rectifying switches.

With illumination of the detector of the form shown in Fig. 8, reproduced as waveform M in Fig. 11, the amplifier outputs will typically have shapes of the form shown in waveforms N and O. The sorting switches $S_1$ and $S_2$ should be phased to change their contacts at the breaks between the exponential portions of waveforms N and O, i. e. at times $t_1$ and $t_2$, half of the period of the pulse signals apart in order to maximize separation of the standard and sample signals.

With such phasing of the sorting switches $S_1$ and $S_2$, the voltages corresponding to waveforms C, D and H, I of Fig. 10 will have the shapes shown in waveforms P, Q and U, V in Fig. 11. For maximum sensitivity the rectifier switches $S_3$ and $S_4$ should be phased to change their contacts at the times $t_3$, $t_4$, $t_5$, $t_6$ when these waveforms P, Q and U, V cross the zero voltage lines i. e. the A. C. axes of these waveforms respectively. The times when waveforms P and Q or U and V cross the zero voltage lines may or may not be separated by one half the shutter cycle, i. e. by one quarter of the cycle in which the pulses from the sample and standard paths recur. The term "shutter cycle" here is used to refer to the time required for one opening of shutter 7 and one occultation thereof. It is necessary however for the preservation of symmetry in the mixing of the sorted signals, as defined in Equations 1 that switches $S_3$ and $S_4$ change their contacts at the same times so that the rectifying points, i. e. the changes of contact on $S_3$ in the sample channel for example, must take place after the rectifying points in the other channel by half the period of the pulse cycle. Thus in terms of Fig. 11, the times $t_5$ and $t_6$ must be respectively one half of a pulse period later than $t_3$ and $t_4$ respectively. It is to be noted that the pulse cycle or period in which successive pulses arrive from the sample or standard paths is twice the period of the shutter. In the embodiment shown the shutter has two shutter cycles per mechanical revolution. The pulse period is shown as $\tau$ in Figs. 10 and 11, and the shutter cycle as $\tau/2$. Hence, in Fig. 1 the mechanical revolution of the shutter occurs in a time $\tau$.

With these phasings of switches $S_1$, $S_2$, $S_3$ and $S_4$ the waveforms corresponding to waveforms A—L of Fig. 10 which occur when signal mixing takes place are shown in Fig. 11 as waveforms N—Y respectively.

In the terminology of the copending application of Donald F. Hornig and George E. Hyde above referred to, the slit illuminator described herein produces symmetric signals consisting of two series of pulses reaching the spectrometer from the standard and sample specimen paths respectively. The pulses of both series have the same shape (although different amplitudes as determined by the transmissions or reflections of the standard and sample specimens), the same period and the pulses of one series are located half way in time between times of the other series although the length of the pulses need not be one quarter of the pulse period. With pulses so disposed, the use of identical intermediate and final signal channels together with sorting to one channel half of the pulse period later than sorting to the other channel and with rectification in one channel half of the pulse period later than in the other, all in accordance with the invention, the mixing in the sorted signals will be symmetric as required by Equations 1 in which the mixing constant is the same in both channels. When the signal mixing is symmetric, compensation may be effected by a single resistor connected between the two final channels at points of equal signal level, preferably immediately before the terminating resistors from which the voltages are taken for ratio measurement. It may in fact be accomplished, unless the signal mixing constant $f$ of Equations 1 is positive, by a resistor connected between intermediate signal channels of the same polarity preceding rectification. If the pulses are of different shapes or are unequally spaced from each other or if the sorting times are unequal or if the intermediate and final channels 430, 440 and 520 of one side differ from the corresponding channels 431, 432 and 540 of the other side, the signals present in the two final channels will be asymmetrically mixed, and in such case either two resistors cross connected between the final channels or two vacuum tube amplifiers are necessary to effect compensation for the signal mixing. Compensation of asymmetrically mixed signals is described in the copending application above referred to.

The slit illuminator of the invention may of course be constructed to produce two series of pulses of different shapes regardless of their amplitudes, or of unequal spacings. In its preferred form however, the spectrophotometer employs a slit illuminator producing two series of pulses of the same shape equally spaced and a sorting and rectifying system producing signals whose mixing, if any, is symmetric.

The preferred embodiment of the invention described herein has incorporated full wave rectification of two oppositely poled amplifier output signals. A fully operable instrument may however be provided with only a single amplifier output, temporally successive portions of such single output being sorted to two intermediate signal channels each of which leads to a double speed rectifier switch operating on the two sides of a final signal channel. Thus sorting and rectification is accomplished in a manner fundamentally similar to that illustrated in Figs. 7, 10 and 11. In such an alternative embodiment neither side of the two final signal channels in the ratio circuit is grounded. The compensating coupling of the invention is connected across similarly poled sides of these final channels as before.

While the embodiment described herein has employed spherical mirrors in the slit illuminator, it is to be understood of course that plane mirrors may be used instead if other means are provided to confine the cross section of the beam appropriately.

I claim:

1. A ratio measuring spectrophotometer comprising a spectrometer, a slit illuminator adapted to apply to the spectrometer two series of light pulses of the same repetition rate, the pulses of each series falling in the intervals between the pulses of the other series, a radiation detector adjacent the exit slit of the spectrometer, a signal amplifier coupled to said detector, two signal channels, means to sort to said channels the output signals of the amplifier during successive light pulses, means in each of said channels to rectify the signals so sorted, and means to measure the ratio of the signals so rectified.

2. A ratio measuring spectrophotometer comprising a spectrometer, a slit illuminator adapted to apply to the spectrometer two series of light pulses of the same repetition rate, the pulses of each series falling in the intervals between the pulses of the other series, a radiation detector adjacent the exit slit of the spectrometer, a signal amplifier coupled to said detector, two signal channels, means to sort the output signal of the amplifier to said channels at a cyclical rate equal to the said repetition rate, means in each of said channels to rectify the signals so sorted, reciprocal coupling means joining said channels, and means to measure the ratio of the signals at the output ends of said channels.

3. A ratio recording spectrophotometer comprising a spectrometer, a slit illuminator adapted to apply to the spectrometer two series of light pulses of the same repetition rate, the pulses of each series falling midway between the pulses of the other series, a radiation detector adjacent the exit slit of the spectrometer, a signal amplifier coupled to said detector, two signal channels, means to sort the output signal of the amplifier to said channels for equal halves of the reciprocal of said repetition rate, means in each of said channels to rectify the signals so sorted, a resistance joining said channels, and means to measure and record the ratio of the signals in said channels.

4. A ratio measuring spectrophotometer comprising a spectrometer, a light pulse generator adapted to provide two series of light pulses of the same shape and period with the pulses of one series falling half way between the pulses of the other, a plurality of mirrors disposed to pass said series of pulses over separate light paths leading to the entrance aperture of the spectrometer, a radiation detector adjacent the exit aperture of the spectrometer, a signal amplifier coupled to the detector, two substantially identical signal channels having substantially identical terminating resistors, means to sort the output of the amplifier to the input ends of said channels for equal halves of said period, rectifying means in each of said channels, a resistor connected between similarly poled sides of said channels, and means to compare the voltage across a fixed fraction of the terminating resistor of one of said channels with the voltage across an adjustable fraction of the terminating resistor of said other channel and to vary said adjustable fraction until the voltages so compared are equal.

5. A ratio recording double beam spectrophotometer comprising a spectrometer having entrance and exit slits, means to generate two series of light pulses of the same shape, duration and repetition rate, with the pulses of one series spaced midway between adjacent pulses of the other series, said pulses having a duration less than one half the reciprocal of their common repetition rate, a plurality of mirrors defining for each of said series of pulses an optical path leading to the entrance slit of the spectrometer, a radiation detector disposed to receive radiation passing through the spectrometer, a signal amplifier coupled to the detector, two substantially identical signal channels having substantially identical terminating resistors, means to sort the output of the amplifier to said channels for equal halves of the reciprocal of said repetition rate, rectifying means in each of said channels, a resistor connected between similarly poled sides of said channels, a servo-amplifier having two input terminals, a connection between an adjustably fixable point on one of said terminating resistors and one of said input terminals, a connection between an adjustable tap on the other of said terminating resistors and said other input terminal, and a linkage between said servo-amplifier and said adjustable tap.

6. A spectrophotometer comprising a radiation source, a shutter positioned to pass and to block successively radiation flowing from the source in a given direction, a movable mirror driven in synchronism with the shutter to send alternate pulses of radiation passing the shutter along separate routes, means to bring said routes into coincidence, a spectrometer positioned to receive upon its entrance slit radiation traversing the routes so recombined, a radiation detector positioned to receive radiation emerging from the spectrometer, an amplifier coupled to the radiation detector, means to provide oppositely phased signal outputs from the amplifier, a first pair of switches each carrying one of the amplifier output signals, two pairs of intermediate signal channels arranged each to present one of its channels to each of the first pair of switches, drive means for the first pair of switches connecting the two channels of one intermediate channel pair with the amplifier outputs for substantially the duration of one illumination and occultation of the spectrometer and connecting the two channels of the other intermediate channel pair with the amplifier outputs for substantially the duration of the next succeeding illumination and occultation of the spectrometer, two final signal channels, a second pair of switches each connecting one of the final signal channels successively with the two members of one intermediate channel pair, means to drive the second pair of switches at twice the speed of the first switches, means to smooth the signals in the final signal channels, and means to compare potentiometrically the said smoothed signals.

7. A spectrophotometer comprising a rotating shutter having alternate opaque and transparent sectors, a rotating mirror having alternate transparent and mirrored sectors, a plurality of fixed mirrors positioned to define with said rotating mirror two light paths originating at said shutter and terminating at one of said fixed mirrors, a spectrometer positioned to be illuminated by light passing down either of said paths from said shutter to said one fixed mirror, a radiation detector adjacent the exit aperture of the spectrometer, an amplifier coupled to said detector, two signal channels, a sorting switch coupled to the shutter to connect the output of the amplifier to one channel for one half the interval of two successive light pulses through the shutter and to the other channel for the other half of said interval, a rectifying switch in each of said channels, and means to couple said rectifying switches together and to said sorting switch to operate in phase at twice the cyclical rate of said sorting switch.

8. In a spectrophotometer including a spectrometer, detector, amplifier and two-channel ratio measuring circuit: means to illuminate the spectrometer with pulses of light from reference and from sample specimens and to sort to the channels of said ratio measuring circuit voltages proportional to the amplitudes of the pulses of light reaching the detector, said means comprising a radiation source, a movable shutter, motor means to open and close the shutter in cyclical order to develop a succession from said source having light pulses of the same shape, duration and period, a first movable mirror linked to said motor means in position and phase to pass and to reflect alternate pulses in said succession, a plurality of fixed mirrors positioned to define for said alternate pulses separate optical paths having a point of recombination, a movable mirror at said second point of recombination linked to said motor means in phase to pass pulses from one of said separate paths and to reflect pulses from the other of said paths in the direction of pulses passed from the first of said paths, a switch electrically coupled between the output of the amplifier and said channels, means to drive said switch at one half the cyclical rate of said shutter, rectifying means in each of said channels, and reciprocal coupling means between said channels adjusted to reduce the signal in one of said channels to zero when the pulses from the sample specimen are of zero amplitude and to reduce the signal in the other of said channels to zero when the pulses from the reference specimens are of zero amplitude.

References Cited in the file of this patent

UNITED STATES PATENTS

| | | |
|---|---|---|
| 2,211,628 | Pineo | Aug. 13, 1940 |
| 2,312,010 | Van Den Akker | Feb. 23, 1943 |
| 2,339,053 | Coleman | Jan. 11, 1944 |
| 2,342,771 | Voigt | Feb. 29, 1944 |
| 2,467,844 | Michel | Apr. 19, 1949 |
| 2,474,098 | Dimmick | June 21, 1949 |
| 2,503,165 | Meyer | Apr. 4, 1950 |
| 2,528,924 | Vassy | Nov. 7, 1950 |
| 2,547,212 | Jamison et al. | Apr. 3, 1951 |
| 2,604,810 | Backhouse | July 29, 1952 |